(12) United States Patent
Braginsky et al.

(10) Patent No.: US 9,131,024 B2
(45) Date of Patent: *Sep. 8, 2015

(54) CONFLICT MANAGEMENT DURING DATA OBJECT SYNCHRONIZATION BETWEEN CLIENT AND SERVER

(75) Inventors: David E. Braginsky, Mountain View, CA (US); Justin M. Rosenstein, Oakland, CA (US); Eric Joseph Uhrhane, Palo Alto, CA (US); David Jeske, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,045

(22) Filed: Sep. 14, 2012

(65) Prior Publication Data

US 2013/0124612 A1 May 16, 2013

Related U.S. Application Data

(63) Continuation of application No. 12/435,317, filed on May 4, 2009, now Pat. No. 8,311,981, which is a continuation of application No. 11/323,198, filed on Dec. 30, 2005, now Pat. No. 7,529,780.

(51) Int. Cl.
*G06F 17/30* (2006.01)
*H04L 29/06* (2006.01)

(52) U.S. Cl.
CPC .......... *H04L 67/42* (2013.01); *G06F 17/30176* (2013.01); *Y10S 707/99938* (2013.01); *Y10S 707/99942* (2013.01); *Y10S 707/99943* (2013.01); *Y10S 707/99953* (2013.01); *Y10S 707/99954* (2013.01)

(58) Field of Classification Search
CPC ..................... G06F 17/30575; G06F 17/30174
See application file for complete search history.

(56) References Cited

U.S. PATENT DOCUMENTS

| 5,675,802 A | 10/1997 | Allen et al. |
| 5,758,355 A | 5/1998 | Buchanan |
| 5,787,413 A | 7/1998 | Kauffman et al. |

(Continued)

OTHER PUBLICATIONS

Uhrhane, Final Office Action, U.S. Appl. No. 12/242,818, May 23, 2013, 51 pgs.

(Continued)

*Primary Examiner* — Mohammad S Rostami
(74) *Attorney, Agent, or Firm* — Morgan, Lewis & Bockius LLP

(57) ABSTRACT

A server stores server metadata entries corresponding to data objects, each server metadata entry including a server file name and an identifier, distinct from the server file name, for a respective data object. The server receives client metadata entries from a client, each client metadata entry corresponding to a data object for which at least one metadata parameter has changed since a prior execution of a synchronization process. Each client metadata entry includes a client file name and an identifier, distinct from the client file name, for a respective data object corresponding to the client metadata entry. The server synchronizes the received client metadata entries with corresponding server metadata entries, if any, having identifiers that match said identifiers in the received client metadata entries, without regard to whether the corresponding server metadata entries include server file names that match the client file names in the received client metadata entries.

14 Claims, 9 Drawing Sheets

(56) References Cited

U.S. PATENT DOCUMENTS

| | | | |
|---|---|---|---|
| 5,870,765 A | 2/1999 | Bauer et al. | |
| 5,944,793 A | 8/1999 | Islam et al. | |
| 5,978,813 A | 11/1999 | Foltz et al. | |
| 5,999,947 A | 12/1999 | Zollinger et al. | |
| 6,061,692 A | 5/2000 | Thomas et al. | |
| 6,078,925 A | 6/2000 | Anderson et al. | |
| 6,128,623 A | 10/2000 | Mattis et al. | |
| 6,151,624 A | 11/2000 | Teare et al. | |
| 6,209,003 B1 | 3/2001 | Mattis et al. | |
| 6,289,358 B1 | 9/2001 | Mattis et al. | |
| 6,311,194 B1 | 10/2001 | Sheth et al. | |
| 6,324,544 B1 | 11/2001 | Alam et al. | |
| 6,430,576 B1 | 8/2002 | Gates et al. | |
| 6,438,563 B1 | 8/2002 | Kawagoe | |
| 6,442,598 B1 | 8/2002 | Wright et al. | |
| 6,526,434 B1 | 2/2003 | Carlson et al. | |
| 6,611,840 B1 | 8/2003 | Baer et al. | |
| 6,697,844 B1 | 2/2004 | Chan et al. | |
| 6,757,696 B2 | 6/2004 | Multer et al. | |
| 6,757,698 B2 | 6/2004 | McBride et al. | |
| 6,804,674 B2 | 10/2004 | Hsiao et al. | |
| 6,823,360 B2 | 11/2004 | Copeland et al. | |
| 6,842,768 B1 | 1/2005 | Shaffer et al. | |
| 6,993,522 B2 | 1/2006 | Chen et al. | |
| 7,024,429 B2 | 4/2006 | Ngo et al. | |
| 7,024,430 B1 | 4/2006 | Ingraham et al. | |
| 7,124,151 B1 | 10/2006 | Choi | |
| 7,155,465 B2 | 12/2006 | Lee et al. | |
| 7,181,731 B2 | 2/2007 | Pace et al. | |
| 7,203,708 B2 | 4/2007 | Liu et al. | |
| 7,219,134 B2 | 5/2007 | Takeshima et al. | |
| 7,240,091 B1 | 7/2007 | Hopmann et al. | |
| 7,293,049 B2 | 11/2007 | Kadyk et al. | |
| 7,315,978 B2 | 1/2008 | Giles | |
| 7,359,955 B2 | 4/2008 | Menon et al. | |
| 7,395,394 B2 | 7/2008 | Federa et al. | |
| 7,475,155 B2 | 1/2009 | Stern et al. | |
| 7,506,019 B2 | 3/2009 | Stern et al. | |
| 7,539,780 B2 | 5/2009 | Makhervaks et al. | |
| 2002/0019935 A1 | 2/2002 | Andrew et al. | |
| 2002/0069192 A1 | 6/2002 | Aegerter | |
| 2002/0124098 A1 | 9/2002 | Shaw | |
| 2002/0194205 A1 | 12/2002 | Brown et al. | |
| 2003/0086700 A1* | 5/2003 | Yamagami | 386/96 |
| 2003/0145020 A1 | 7/2003 | Ngo et al. | |
| 2004/0122870 A1 | 6/2004 | Park et al. | |
| 2004/0128292 A1* | 7/2004 | Kinnell | 707/9 |
| 2004/0128556 A1* | 7/2004 | Burnett | 713/201 |
| 2004/0202348 A1 | 10/2004 | Kuzma | |
| 2004/0243644 A1 | 12/2004 | Steere et al. | |
| 2005/0086390 A1 | 4/2005 | Banerjee et al. | |
| 2005/0102328 A1* | 5/2005 | Ring et al. | 707/201 |
| 2005/0114711 A1 | 5/2005 | Hesselink et al. | |
| 2005/0177617 A1* | 8/2005 | Banginwar et al. | 709/203 |
| 2005/0203962 A1 | 9/2005 | Zhou et al. | |
| 2005/0216524 A1 | 9/2005 | Gomes et al. | |
| 2005/0256907 A1* | 11/2005 | Novik et al. | 707/200 |
| 2006/0004765 A1 | 1/2006 | Anderson et al. | |
| 2006/0010130 A1* | 1/2006 | Leff et al. | 707/8 |
| 2006/0015539 A1 | 1/2006 | Wolf et al. | |
| 2006/0031264 A1 | 2/2006 | Bosworth et al. | |
| 2006/0041596 A1 | 2/2006 | Stirbu et al. | |
| 2006/0059208 A1* | 3/2006 | Chen et al. | 707/201 |
| 2006/0080353 A1 | 4/2006 | Miloushev et al. | |
| 2006/0106879 A1 | 5/2006 | Zondervan et al. | |
| 2006/0123010 A1 | 6/2006 | Landry et al. | |
| 2006/0136511 A1 | 6/2006 | Ngo et al. | |
| 2006/0155945 A1 | 7/2006 | McGarvey | |
| 2006/0242444 A1 | 10/2006 | Novik et al. | |
| 2007/0043715 A1* | 2/2007 | Kaushik et al. | 707/4 |
| 2007/0073766 A1 | 3/2007 | Porter | |
| 2008/0046476 A1 | 2/2008 | Anderson et al. | |
| 2008/0133618 A1 | 6/2008 | Kawabe et al. | |
| 2008/0133922 A1 | 6/2008 | Williams | |
| 2008/0162944 A1 | 7/2008 | Suzuki | |
| 2009/0307277 A1 | 12/2009 | Grubov et al. | |

OTHER PUBLICATIONS

Bradshaw, Office Action, U.S. Appl. No. 12/242,811, Jul. 6, 2011.
Bradshaw, Office Action, U.S. Appl. No. 12/242,811, Jan. 19, 2011.
Braginsky, Examiner's Answer, U.S. Appl. No. 11/323,199, Mar. 29, 2011.
Braginsky, Notice of Allowance, U.S. Appl. No. 11/323,198, Jan. 8, 2009.
Braginsky, Notice of Allowance, U.S. Appl. No. 12/435,317, Mar. 5, 2012, 23 pgs.
Braginsky, Notice of Allowance, U.S. Appl. No. 12/435,317, Jul. 13, 2012, 11 pgs.
Braginsky, Office Action, U.S. Appl. No. 11/323,198, Jul. 18, 2008.
Braginsky, Office Action, U.S. Appl. No. 11/323,198, Jan. 31, 2008.
Braginsky, Office Action, U.S. Appl. No. 11/323,199, Jan. 8, 2008.
Braginsky, Office Action, U.S. Appl. No. 11/323,199, Aug. 9, 2010.
Braginsky, Office Action, U.S. Appl. No. 11/323,199, Aug. 17, 2009.
Braginsky, Office Action, U.S. Appl. No. 11/323,199, Feb. 17, 2009.
Braginsky, Office Action, U.S. Appl. No. 11/323,199, Jan. 21, 2010.
Braginsky, Office Action, U.S. Appl. No. 11/323,199, Jul. 29, 2008.
Braginsky, Office Action, U.S. Appl. No. 12/435,317, May 13, 2011.
Braginsky, Office Action, U.S. Appl. No. 12/435,317, Nov. 17, 2010.
Braginsky, Office Action, U.S. Appl. No. 12/435,317, Nov. 28, 2011, 47 pgs.
Uhrhane, Office Action, U.S. Appl. No. 12/242,818, Aug. 3, 2011, 39 pgs.
Uhrhane, Office Action, U.S. Appl. No. 12/242,818, Apr. 19, 2012, 52 pgs.
Bradshaw, Office Action, U.S. Appl. No. 12/242,811, Feb. 26, 2013, 20 pgs.
Challenger, Efficiently Serving Dynamic Data at Highly Accessed Web Sites, IEEE 2004, ACM Transactions on Networking, vol. 2, No. 2, Apr. 2004, 14 pgs.
Bradshaw, Final Office Action, U.S. Appl. No. 12/242,811, Aug. 26, 2013, 34 pgs.
Uhrhane, Notice of Allowance, U.S. Appl. No. 12/242,818, Sep. 19, 2013, 20 pgs.
Bradshaw, Office Action, U.S. Appl. No. 12/242,811, Oct. 29, 2014, 23 pgs.

\* cited by examiner

| Metadata Entry for DO₁ ||| |
|---|---|---|
| DO₁ Identifier ||| |
| Client Metadata Entry | Server Metadata Entry | Last Server Metadata Entry |
| Version No. | | |
| Name | Name | Name |
| Synched/ Unsynched | Synched/ Unsynched | Synched/ Unsynched |
| Deleted Flag | Deleted Flag | Deleted Flag |
| Path | Path | Path |
| Size | Size | Size |
| Permissions | Permissions | Permissions |
| Checksum | Checksum | Checksum |

FIG. 2B

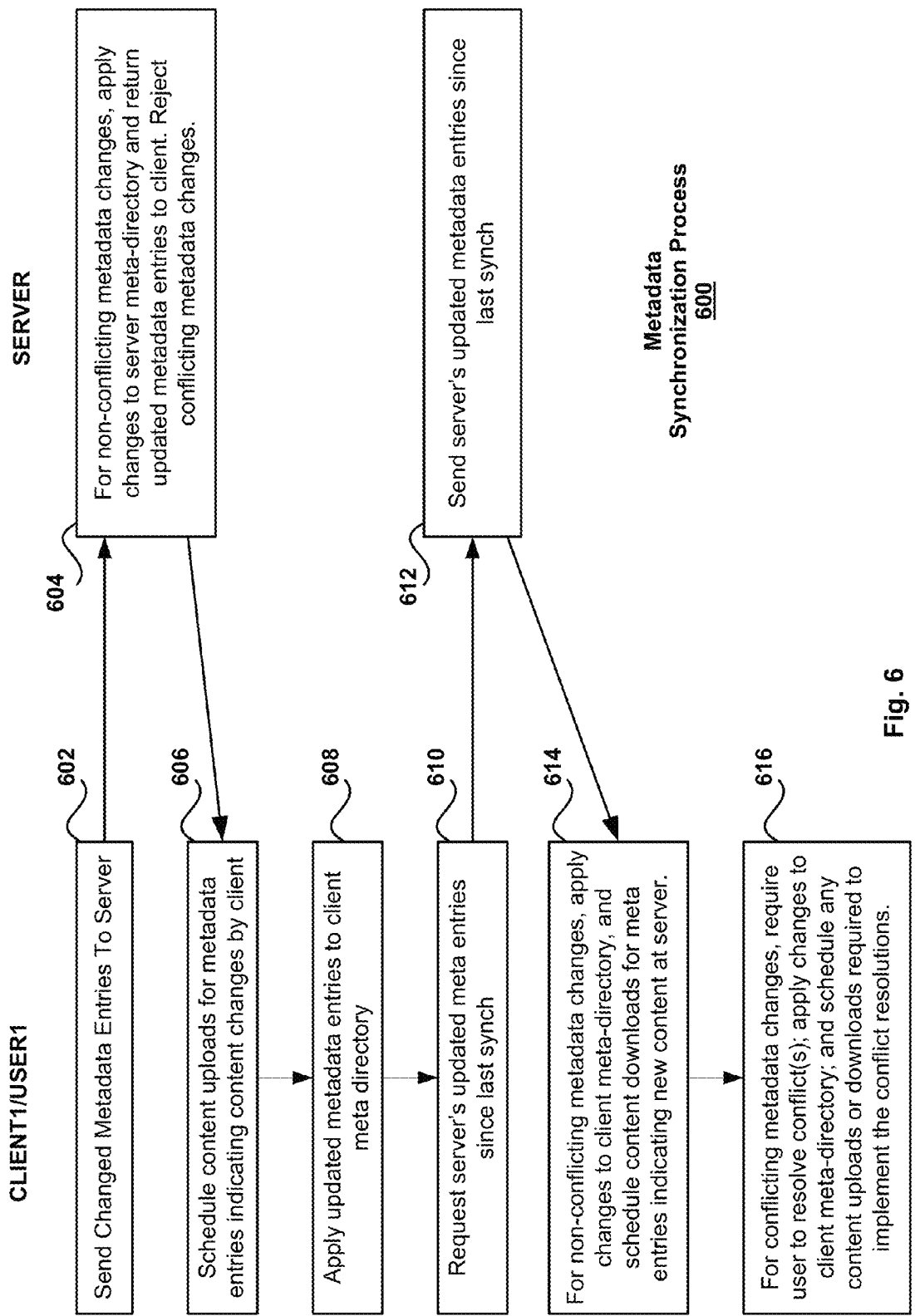

CONFLICT MANAGEMENT DURING DATA OBJECT SYNCHRONIZATION BETWEEN CLIENT AND SERVER

RELATED APPLICATIONS

This application is a continuation of the U.S. patent application Ser. No. 12/435,317, filed May 4, 2009 now U.S. Pat. No. 8,311,981, entitled "Conflict Management during Data Object Synchronization Between Client and Server," which is a continuation of the U.S. patent application Ser. No. 11/323,198, filed Dec. 30, 2005, entitled "Conflict Management during Data Object Synchronization Between Client and Server," now U.S. Pat. No. 7,529,780, all of which are incorporated by reference herein in their entireties.

This application is related to U.S. patent application Ser. No. 11/323,199, filed Dec. 30, 2005, entitled "Locally Cached File System," which application is incorporated by reference herein in its entirety.

TECHNICAL FIELD

The embodiments disclosed herein relate to synchronizing data files, and in particular to systems and methods for managing shared data conflicts across multiple different computing devices.

BACKGROUND

Data conflicts typically occur when users access data stored in enterprise information storage and retrieval systems and when users synchronize data between different computing devices. Such computerized information storage and retrieval systems typically allow one user at a time to access and modify any particular data file stored in the system. For example, while a first user has a data file checked-out, other users are prevented from checking-out the same file and modifying it. However, other users may still view, copy or print the document, while it is checked-out. Such systems do not require sophisticated conflict resolution mechanisms, as any single data file may only be modified by one user at a time.

Other systems that require synchronizing two different data files on two different computing devices require more sophisticated conflict resolution mechanisms. Most of the time, conflicts arise because the same data file has been altered on both computing devices. For example, a user changes a calendar entry on his Personal Digital Assistant (PDA), while the user's secretary concurrently changes the same calendar entry on a corporate server. During synchronization, the user is typically presented with a choice of which file to keep, e.g., the file on the PDA or the file on the desktop computer. These types of conflict resolution procedures are typically limited to the same user using two separate devices, but do not address conflicts that arise between multiple users using multiple different devices.

In light of the above, it would be highly desirable to provide a system and method for managing conflicts that arise when multiple different users and/or computing devices have access to the same data files.

SUMMARY OF DISCLOSED EMBODIMENTS

According to some embodiments there is provided a computer implemented method for managing shared data conflicts. In one aspect of the method, a server stores server metadata entries corresponding to data objects, each server metadata entry including a server file name and an identifier, distinct from the server file name, for a respective data object. The server receives client metadata entries from a client, each client metadata entry corresponding to a data object for which at least one metadata parameter has changed since a prior execution of a synchronization process. Each client metadata entry includes a client file name and an identifier, distinct from the client file name, for a respective data object corresponding to the client metadata entry. The server synchronizes the received client metadata entries with corresponding server metadata entries, if any, having identifiers that match said identifiers in the received client metadata entries, without regard to whether the corresponding server metadata entries include server file names that match the client file names in the received client metadata entries.

BRIEF DESCRIPTION OF THE DRAWINGS

For a better understanding of the nature and objects of the invention, reference should be made to the following detailed description taken in conjunction with the accompanying drawings, in which:

FIG. 2B is a schematic representation of a single metadata entry on the client computer shown in FIG. 2A, according to an embodiment of the invention;

FIG. 6 is a flow chart of one embodiment of a metadata synchronization process.

Like reference numerals refer to the same or similar components throughout the several views of the drawings.

DETAILED DESCRIPTION OF THE EMBODIMENTS

The following describes various embodiments of a system and method for managing data conflicts. In particular, the described embodiments manage shared data conflicts between multiple versions of a shared data object.

Figure 1:
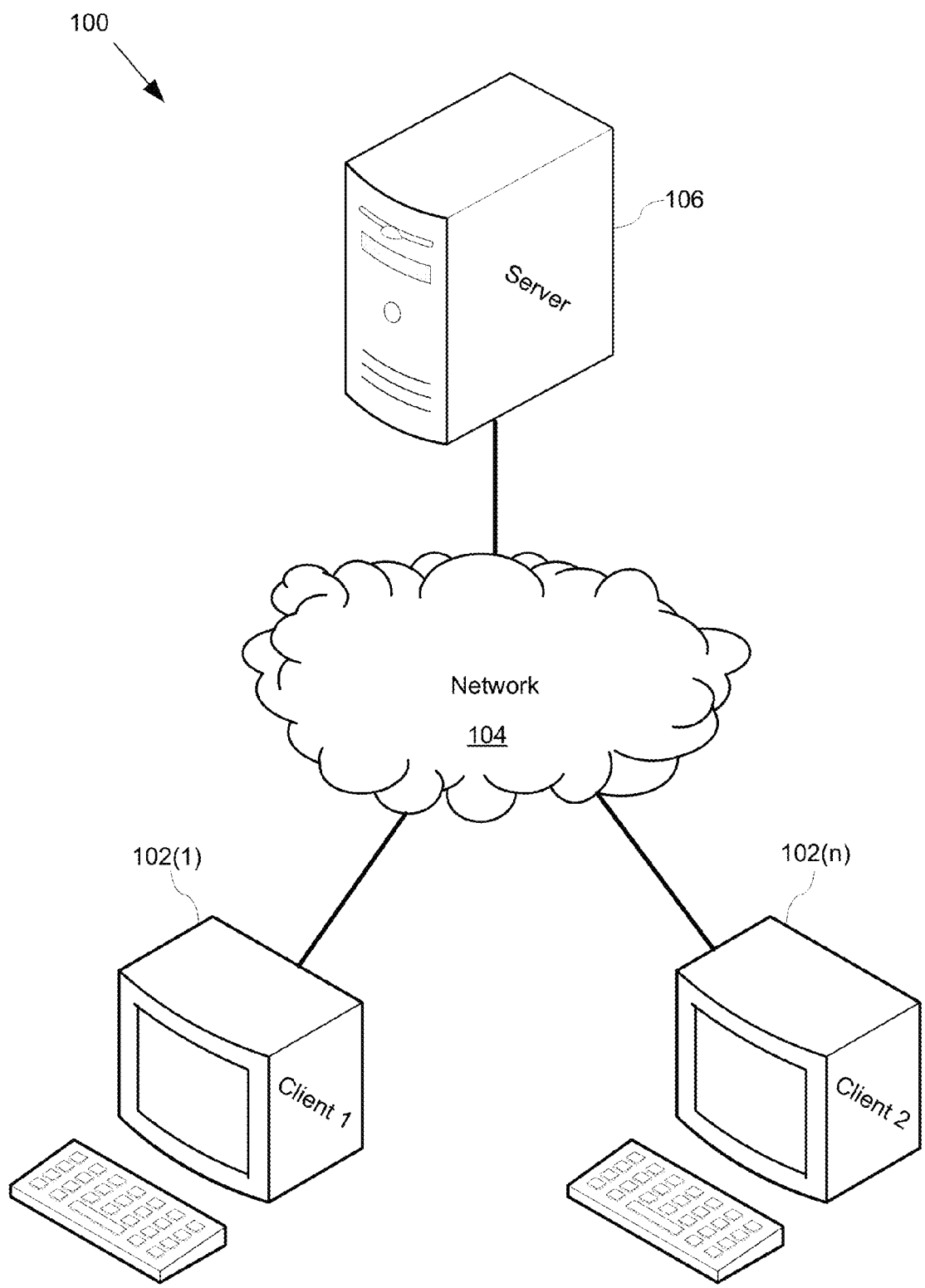
FIG. 1 is a schematic diagram of the architecture of a system for managing data conflicts, according to an embodiment of the invention.

FIG. 1 is a schematic diagram of the architecture 100 of a system for managing data conflicts. The system includes one or more client computers 102(1)-(n) electronically coupled to a network 104. In some embodiments, the client computers 102(1)-(n) are desktop computers, while in other embodiments, the client computers 102(1)-(n) are any other type of computing device, such as laptop computers, handheld computers, personal digital assistants (PDAs), cellular telephones, set-top boxes or the like. Also in some embodiments, the network 104 is a wide area network (WAN), such as the Internet, while in other embodiments the network is any other suitable network, such as a local area network (LAN) or the like.

A server 106 is also electrically coupled to the network, such that the client computers 102(1)-(n) can communicate with the server 106 via the network 104.

In use, the server acts as a virtual file repository or disk drive for the client computers 102(1)-(n), i.e., the local client computers and the server store synchronized copies of various data objects. Data objects as used herein are any collection of related data or program records stored as a unit, such as folders, data files, email messages, instant messages, text documents, word processing documents, figures, databases or the like. Where possible, e.g., where the client and server are connected via the network, local data objects on the client computers and server data objects on the server are synchronized, subject to the conflict resolution procedures described below in relation to FIGS. 4A, 4B, 5A and 5B.

Figure 2A:
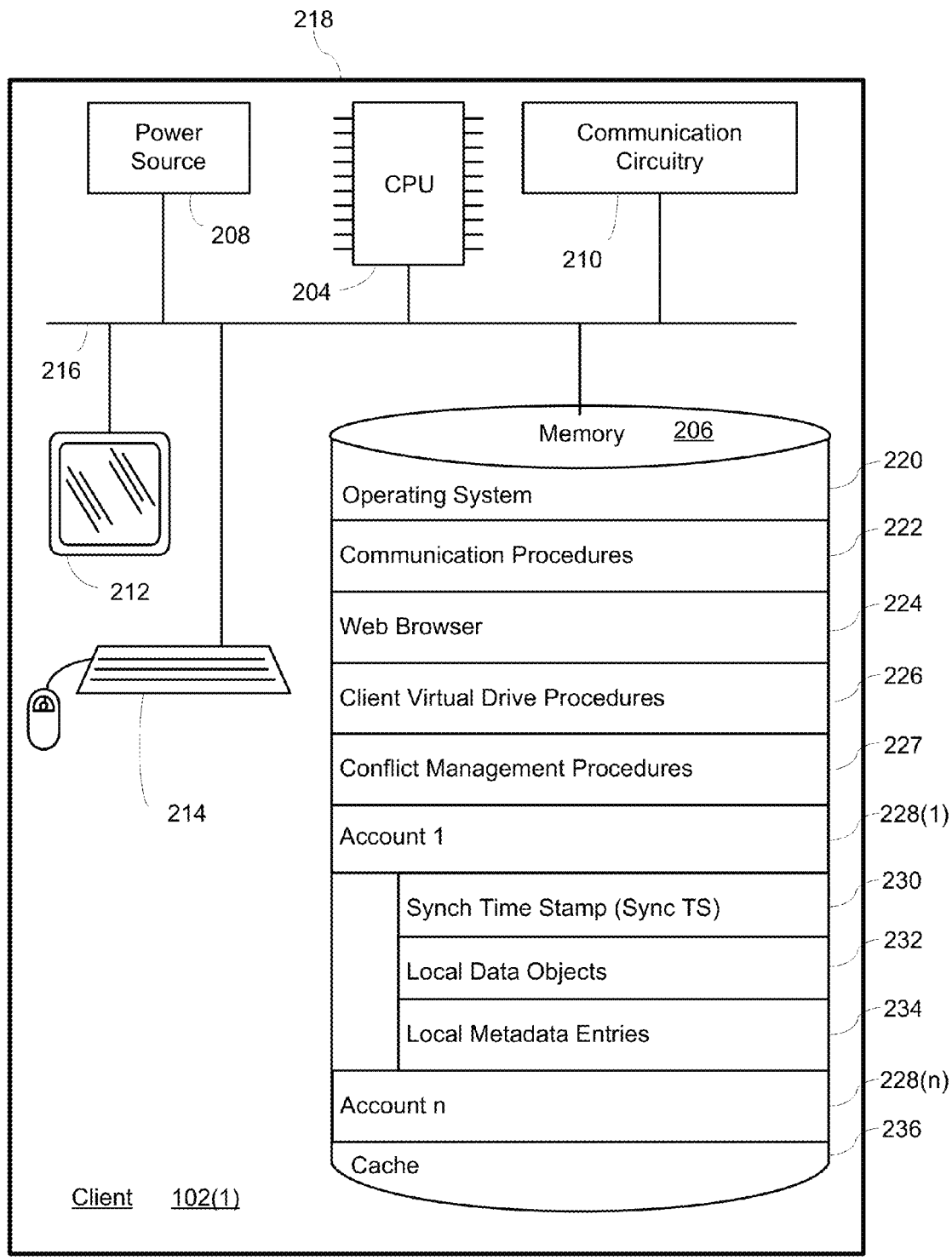
FIG. 2A is a block diagram of any one of the client computers shown in FIG. 1.

FIG. 2A is a block diagram of any one of the client computers 102(1)-(n) shown in FIG. 1. The client computer may contain various components, such as a processor, like a central processing unit (CPU) 204, a memory 206, a power source 208, communications circuitry 210, input and/or output devices, like a monitor 212 and a keyboard and mouse 214, and at least one bus 216 that connects the aforementioned components. In some embodiments, these components are at least partially housed within a housing 218.

The memory 206 (which may comprise or include a computer readable storage medium) preferably includes an operating system 220, such as LINUX, having instructions for processing, accessing, storing, or searching data, etc. The memory 206 also preferably includes communications procedures 222 for communicating with the network 104 (FIG. 1) and/or server 106 (FIG. 1); a web browser 224, such as Mozilla FIREFOX; client virtual drive procedures 226, the function of which is described below in relation to FIGS. 4A, 4B, 5A and 5B; conflict management procedures 327, the function of which is also described below in relation to FIGS. 4A-C and 5; one or more local user accounts 228(1)-(n); and a cache 232 for temporarily storing data.

In some embodiments, each user account 228 includes a synchronization time stamp (Sync TS) that provides an indication of when that account was last synchronized with the server 106 (FIG. 1). In some embodiments, each user account 228 also includes a number of local data objects 232, such as data files, and a number of local metadata entries 234. Each data object is associated with a single metadata file.

In some embodiments, the client virtual drive procedures 226 mount as part of the client computer's file system and handle at least some of the operating system's input and output calls. In an alternative embodiment, no virtual drive procedures 226 are present on the client computer, which handles all virtual drive instructions and communication through the Web Browser 224.

FIG. 2B is a schematic representation of a single metadata entry 250 on the client computer 102(1) shown in FIG. 2A. The metadata entry 250 includes an identifier 252 (sometimes called the data object identifier or file identifier) for the data object with which it is associated. The metadata entry 250 also includes various metadata fields 256-270 for the client, server, and prior fields for the server. In some embodiments, these various metadata fields 256-270 include a version number 256; the name 258 of the associated data object; an indication 260 of whether the metadata entry has been synchronized or not (synched or unsynched); a delete flag 262 indicating that the metadata entry should be deleted; a path 264 for the data object, such as "C:/GDRIVE/Presentation-.doc"; the size 266 of the data object; the permissions 268 associated with the data object, such as read, write, copy, print, and view permissions; and a checksum 270 of the data object. The use of some of these metadata fields is explained in further detail below.

Figure 3:
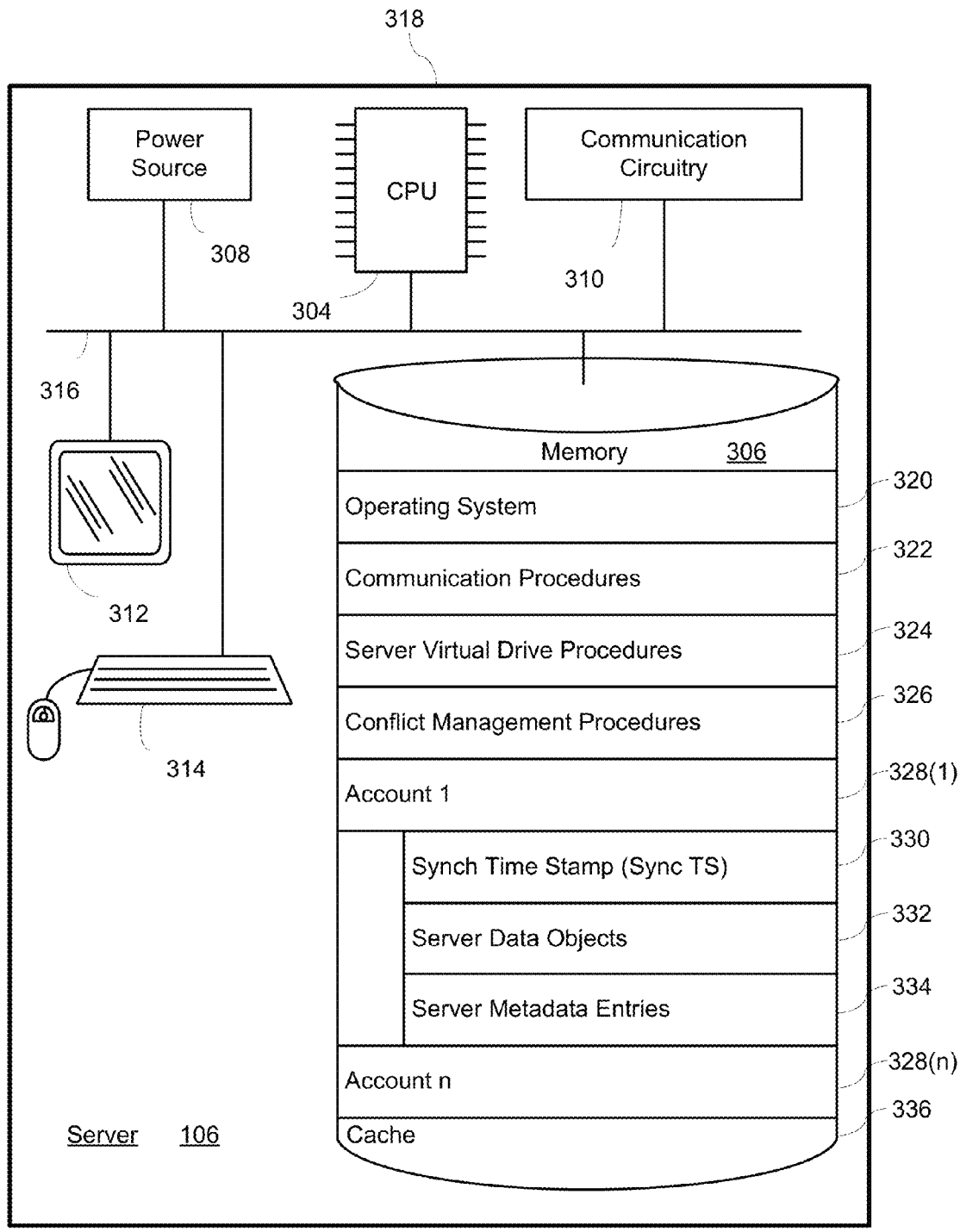
FIG. 3 is a block diagram of the server computer shown in FIG. 1.

FIG. 3 is a block diagram of the server computer 106 shown in FIG. 1. The server 106 may contain various components, such as a processor, like a central processing unit (CPU) 304, a memory 306, a power source 308, communications circuitry 310, input and/or output devices, like a monitor 312 and a keyboard and mouse 314, and at least one bus 316 that connects the aforementioned components. In some embodiments, these components are at least partially housed within a housing 318.

The memory 306 (which may comprise or include a computer readable storage medium) preferably includes an operating system 320, such as LINUX, having instructions for processing, accessing, storing, or searching data, etc. The memory 306 also preferably includes communications procedures 322 for communicating with the network 104 (FIG. 1), and/or client 102(1)-(n) (FIG. 1); server virtual drive procedures 324, the function of which is described below in relation to FIGS. 4A-C and 5; conflict management procedures 326, the function of which is also described below in relation to FIGS. 4A-C and 5; one or more user accounts 328(1)-(n); and a cache 332 for temporarily storing data.

In some embodiments, each user account 328 includes a synchronization time stamp (Sync TS) that provides an indication of when that account was last synchronized with the client 102 (FIG. 1). In some embodiments, each user account 328 also includes a number of server data objects 332, such as data files, and a number of server metadata entries 334. Each data object is associated with a single metadata file.

Metadata Synchronization Process—Overview

FIG. 6 is a flow diagram of an embodiment of a metadata synchronization process 600. A more detailed description of the metadata synchronization process is provided below with reference to FIGS. 4A, 4B and 4C. The metadata synchronization process may be performed separately for each share, or it may be performed for all shares to which a user has access rights. However, since different shares may be stored on different file servers, the following explanation is directed to synchronizing the metadata for a single share. The metadata synchronization process 600 is repeatedly performed periodically (e.g., once every N seconds, where N is in the range of 1 to 10) or episodically (e.g., in response to the occurrence of any one of a predefined set of trigger conditions). As explained in more detail below, some synchronization operations require more than one iteration of the metadata synchronization process 500 to be completed.

In a first phase (operations 602-608), sometimes called the commit phase, the client system sends to the server all client metadata entries (also sometimes called client meta-directory entries) that have been modified by the client (602). In some embodiments, client metadata entries that have been modified are marked with an IS_DIRTY flag. In some embodiments each field of each client and server metadata entry includes a flag (sometimes called the "modified flag") that is set whenever the content of the associated field is modified, and that is reset when the entry is synchronized with the corresponding client or server metadata entry. In some embodiments, the entire content of each changed metadata entry is sent to the server, while in other embodiments only changed fields of the entry are sent. The server receives the metadata entries from the client, identifies any received entries that conflict with entries in the server's corresponding meta-directory, and rejects the conflicting entries (i.e., the received entries that conflict with corresponding entries in the server's meta-directory) (604). A received client metadata entry conflicts with a server metadata entry when both entries have the same data object identifier, and both contain an updated value for the same metadata parameter that has been updated since the last server-client synchronization of these client and server metadata entries. For instance, if both entries (which have matching data object identifiers) have updated file sizes, or both entries has updated file names, then the two entries conflict and the server rejects the received client metadata entry. More generally, if both the client and server metadata entries have updated "parameter x" values, where "parameter x" is any parameter of these metadata entries, the two entries conflict and the server rejects the received client metadata entry. In some embodiments, rejected entries are not processed and thus their changed fields are not applied to the corresponding entries in the server's meta-directory. The remaining client metadata entries, which do not conflict with entries in the server's corresponding meta-directory, are accepted by the server and are used to update the server's meta-directory (604). For example, the updating may be performed in some embodiments by updating changed fields in existing metadata entries, assigning data object IDs to new meta entries and inserting the new metadata entries into the server's metadata table.

In some embodiments, the server assigns a version number to each new server metadata entry and assigns a new version number to each updated server metadata entry. Alternately, or in addition, it may store a timestamp in the server metadata entry to indicate the date and time of the last update made to the server metadata entry. The server metadata entries modified in response to the client metadata entries sent to the server are sent to the client (604). The client processes the received server metadata entries (606, 608). One aspect of this processing is identifying metadata entries that indicate revised file content located at the client, and scheduling content uploads of those files to the server (606). In some embodiments, the metadata entries include a content checksum field, and an update flag for that field that indicates whether the content checksum field contains an updated value. When the upload for a file is completed, the server changes its meta entry to clear the update flag, and that update is copied to the corresponding client metadata entry during a next iteration of the metadata synchronization process. Another aspect of processing the received server metadata entries is updating or overwriting the corresponding client metadata entries with the information in the received server meta entries (608). In summary, operations 602 through 608 synchronize updated client metadata entries with the corresponding server metadata entries, excluding client metadata entries that have updates that conflict with server metadata entries.

Next, in a second phase of the metadata synchronization process, sometimes called the get updates phase, the client requests from the server copies of all server metadata entries revised since the last metadata synchronization (610). As noted above, each metadata entry includes a timestamp (synch_ts) indicating the last time the entry was changed on the server. The server identifies and sends to the client the requested server metadata entries (612). For ease of explanation, separate discussions are provided for the handling of server metadata entries that do not conflict with client metadata entries and for the handling of those server metadata entries that do conflict with client metadata entries. It may be noted that the server metadata entries sent to the client at 612 may include server metadata entries corresponding to any client metadata entries rejected by the server at 604 due to conflicting updates.

When a received server metadata entry does not conflict with any corresponding client metadata entries (i.e., entries having the same filed ID and/or the same filename), the metadata changes in the server metadata entry are applied to the corresponding client metadata entry (614). Alternately, the received server metadata entry is used to overwrite the corresponding client metadata entry, if any. When there is no corresponding client metadata entry, a new client metadata entry is generated. In addition, if the server metadata entry indicates revised file content located at the server, the client schedules a content download of the files from the server (614).

When a received server metadata entry conflicts with one or more corresponding client metadata entries (i.e., entries having the same filed ID and/or the same filename), the process requires a user to resolve the conflict (616). As noted above, the user may resolve the conflict by selecting a client or server version of a file (and its metadata) as the "winner," in which case the losing file and/or its metadata will be overwritten by the winning file and/or its metadata, or the user may rename or move the conflicting client file so as to eliminate the conflict. Changes are applied to the client meta-directory in accordance with the user specified resolution of the conflict (616). This may include deleting or revising one or more client metadata entries. In addition, the client schedules any file content uploads or downloads needed to implement the user specified resolution of the conflict (616). For instance, when the server metadata entry is selected by the user as the winning entry, and that entry includes an update flag or other data that indicates that the content of the corresponding server file is new or updated, a file download is scheduled. More generally, if the server metadata entry survives the conflict resolution process and includes an update flag or other data that indicates that the content of the corresponding server file is new or updated, a file download is scheduled. On the other hand, if the conflict resolution process results in a client metadata entry that includes an update flag or other data that indicates that the content of the corresponding client file is new or updated, a file upload will be scheduled during the next metadata synchronization cycle (i.e., when operations 602-606 are next performed). The scheduling and execution of file uploads and downloads is discussed in more detail in a related patent application, U.S. patent application Ser. No. 11/323,199, filed Dec. 30, 2005, entitled "Locally Cached File System."

If a new or updated a client metadata entry includes a file path that requires changes to the directory structure of the meta-directory, then appropriate directory or folder entries are created, revised or deleted to reflect the revised directory structure. Similarly, if a file is moved from one directory or folder to another, those changes are reflected in the corresponding metadata entries, and all such changes in the client meta-directory are replicated in the server meta-directory during the next metadata synchronization cycle.

Metadata Synchronization Process—Detailed Discussion

Figure 4A:
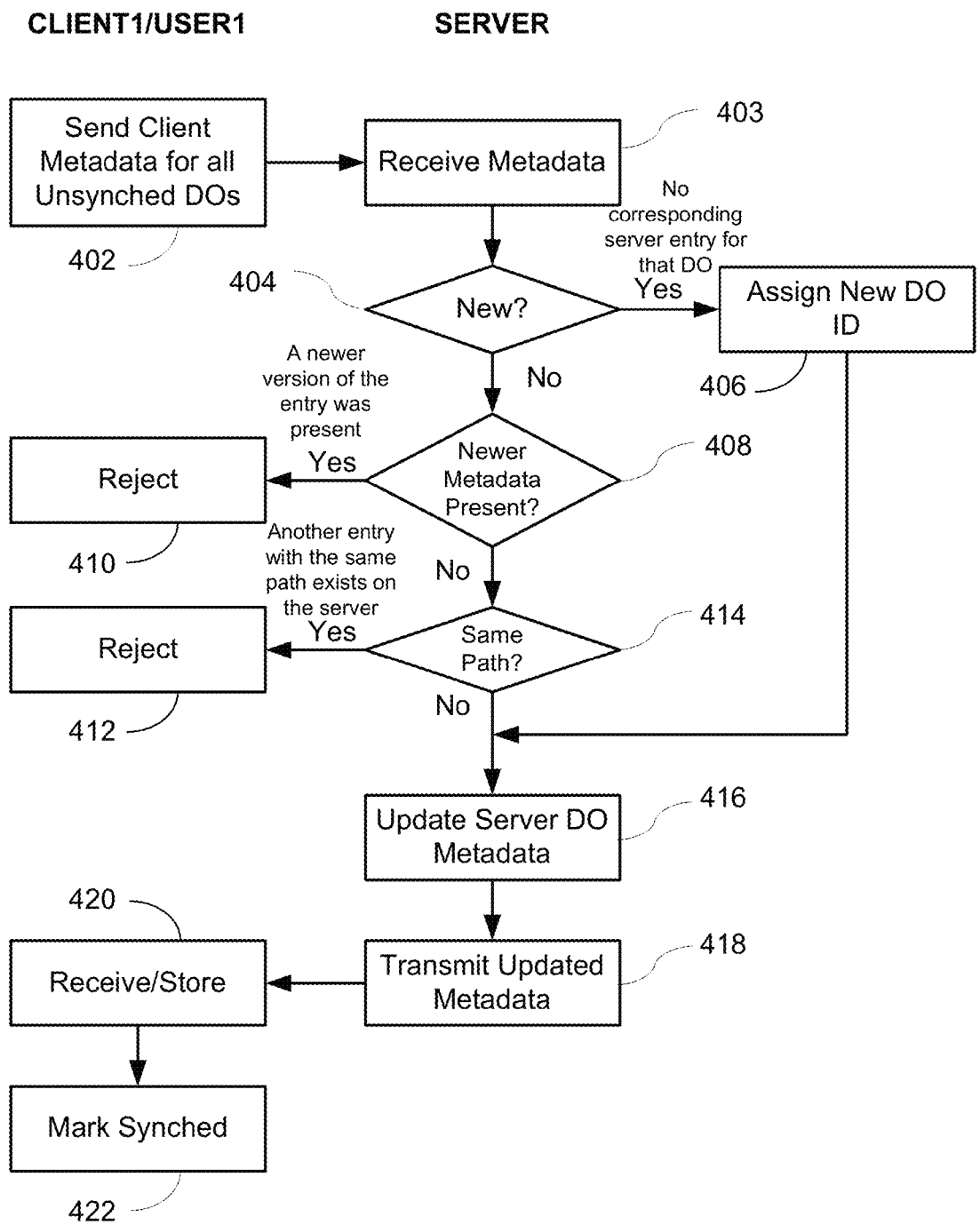
FIG. 4A is a flow chart of a commit phase of a metadata synchronization process, according to an embodiment of the invention.

FIG. 4A is a flow chart of a commit phase 400 of a metadata synchronization process 600, according to an embodiment of the invention. In some embodiments, the operations performed by the client in the commit phase 400 are performed by the virtual drive procedures 226 (FIG. 2A) and/or the conflict management procedures 227 (FIG. 2A). Similarly, the operations performed by the server in the commit phase 400 are performed by the virtual drive procedures 324 (FIG. 3) and/or the conflict management procedures 326 (FIG. 3) on the server.

As soon as a change is made to any data object or metadata on the client computer or "client" 102 (FIG. 1), the client sends the server 106 (FIG. 1) all unsynchronized metadata entries (402), i.e., all of the metadata entries with the field 260 (FIG. 2B) that is marked as unsynched. Alternatively, the client sends all unsynchronized metadata entries to the server periodically, such as every 5 minutes. It is axiomatic that the client will not send these unsynchronized metadata entries to the server unless the client is connected to the server via the network 104 (FIG. 1). The server then receives all of the unsynchronized metadata entries from the client (403). For ease of explanation, only a single metadata entry will be described. However, it should be appreciated that many different metadata entries are communicated between the client and the server.

The server then determines whether the metadata entry is new (404), i.e., does the account on the server include a metadata entry with the same data object identifier 252 (FIG. 2B). If the metadata entry is new (404—Yes), then the server assigns a new data object identifier 252 (FIG. 2B) to the new metadata entry (406), and updates the server metadata entries 334 (at 416), with the new metadata entry received from the client. If, however, the metadata entry is not new (404—No), then the server determines if a newer version of the metadata entry is present on the server (408).

If newer metadata is present on the server (408—Yes), then the server rejects the metadata entry received from the client (410). In addition to checking for newer metadata, the server determines, at 414, if another data object exists on the server with the same path. This determination is undertaken by examining the path fields 264 (FIG. 2B) in the two compared metadata entries. If another data object exists on the server with the same path (414—Yes), then the server rejects the metadata entry received from the client at 412. However, if new metadata is not present on the server (408—No) and another data object does not exist on the server with the same path (414—No), then the server updates the server metadata entries 334, at 416, with the new metadata entry received from the client.

Optionally, when the server rejects a metadata entry from the client, the rejection may include a rejection message that is transmitted to the client from the server. However, as described below, rejected metadata entries from the client are either automatically overwritten or cause a conflict resolution request to be sent to the user during the "get updates" phase of the metadata synchronization process. As a result, in some embodiments rejected metadata entries do not cause a rejection message to be sent to the client.

The updated metadata entry on the server is then transmitted back to the client at 418. The client receives and stores the updated metadata entry at 420, and marks the metadata entry synched/unsynched field 260 (FIG. 2B) as synchronized or synched at 422. In some embodiments, the updated metadata entry is assigned a new version number by the server prior to the metadata entry being sent back to the client at 418, thereby ensuring that both client and server have the same, latest version of the metadata entry. Other fields of the metadata entry, such a synchronization timestamp, may also be updated by the server during this process.

The above described commit phase 400 of the metadata synchronization process ensures that new or newer data objects, and their associated metadata, created on the client are uploaded to the server. Any potential conflicts are rejected and dealt with during the get updates phase 430 described below.

Figure 4B:
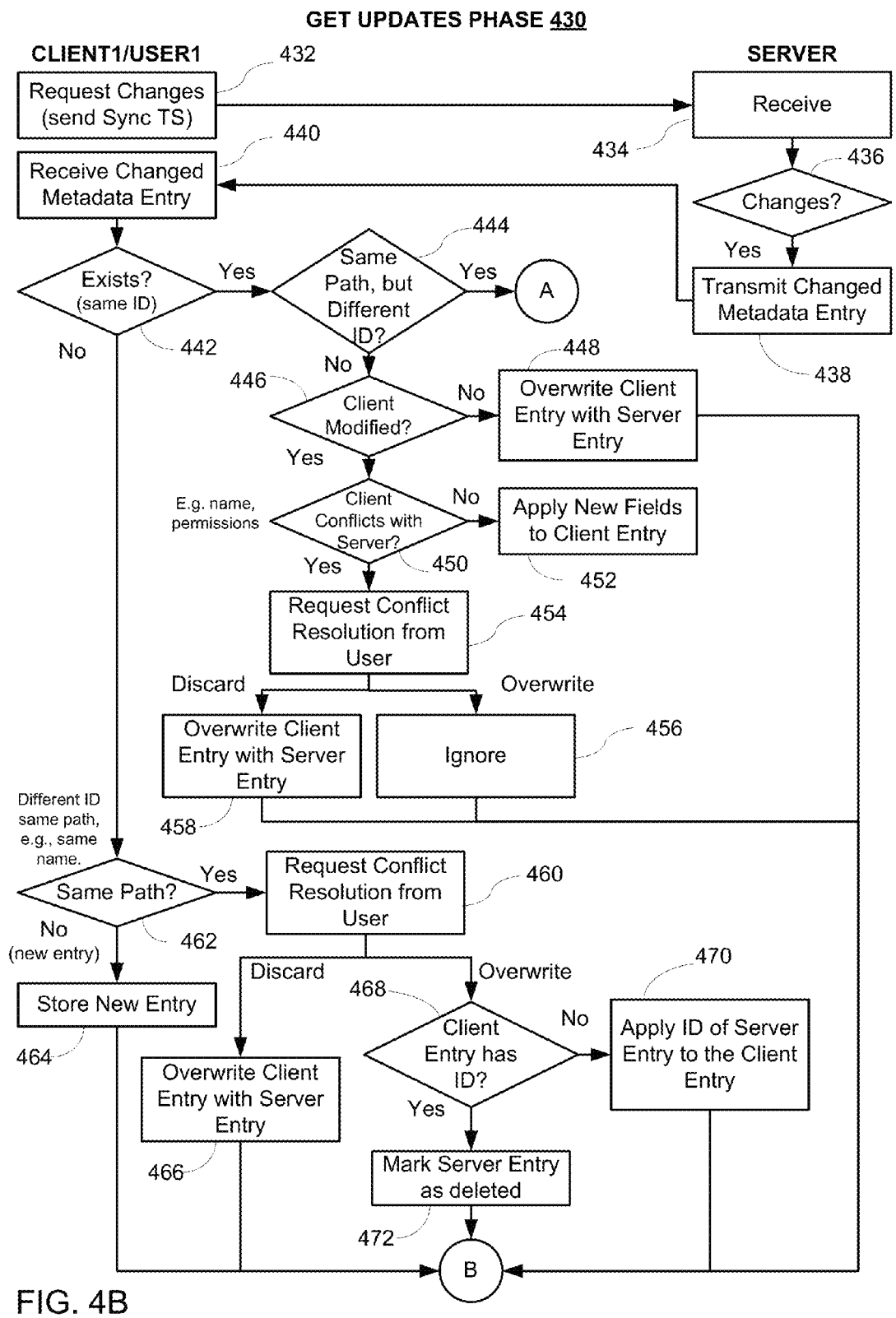
FIGS. 4B and 4C are a flow chart of a get updates phase of the metadata synchronization process, which includes a conflict management process, according to an embodiment of the invention.
Figure 4C:
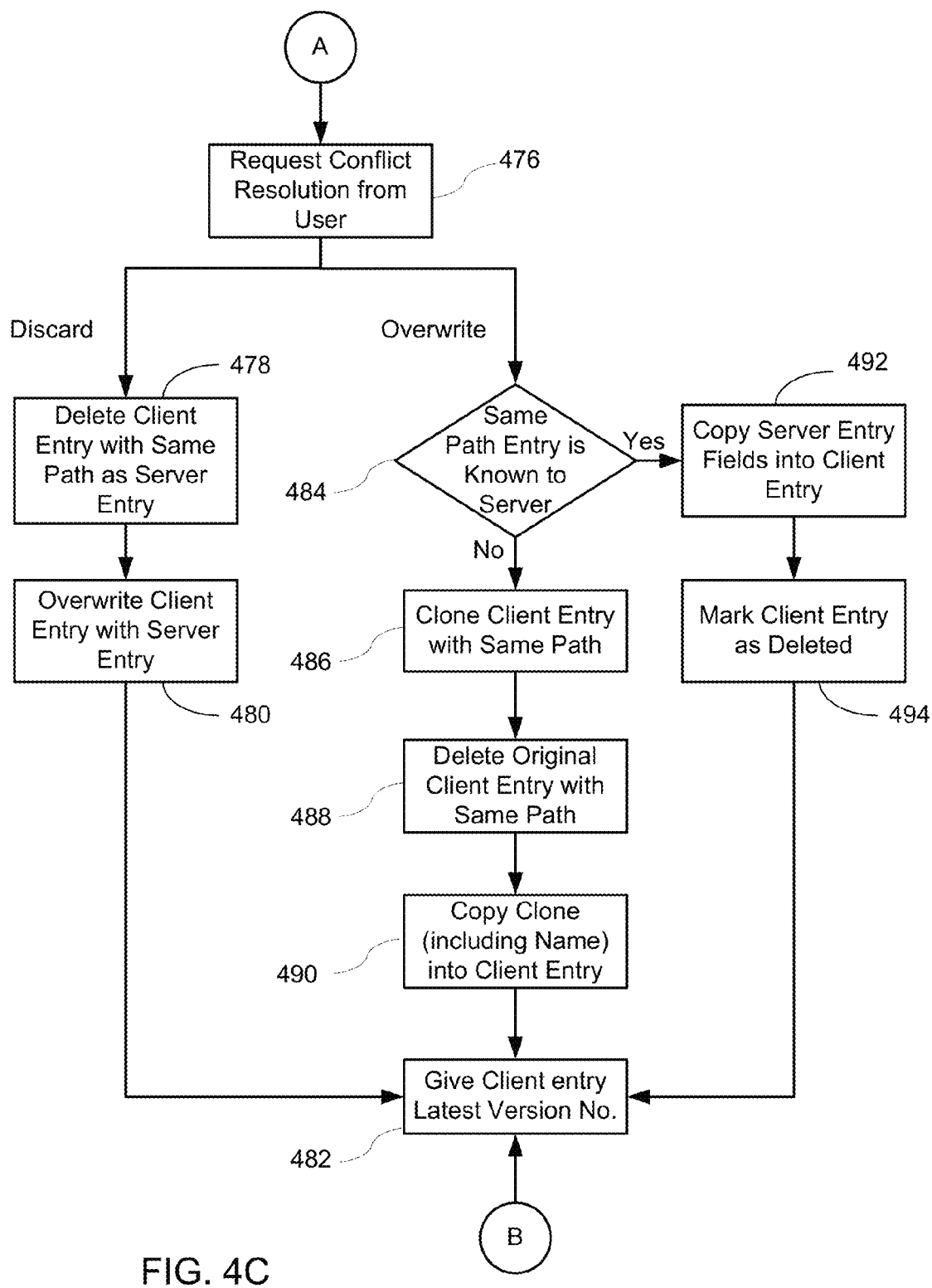

FIGS. 4B and 4C are a flow chart of a get updates phase 430 of the metadata synchronization process 600. In some embodiments, the operations performed by the client in the get updates phase 430 are performed by the virtual drive procedures 226 (FIG. 2A) and/or the conflict management procedures 227 (FIG. 2A). Similarly, the operations performed by the server in the get updates phase 430 are performed by the virtual drive procedures 324 (FIG. 3) and/or the conflict management procedures 326 (FIG. 3).

In some embodiments, the get updates phase 430 of the metadata synchronization process is performed after each execution of the commit phase 400. Alternately, the get updates phase 430 may be executed either periodically, or episodically in response to a trigger condition (e.g., connection to the server, or a client request for a data object from the server). The client transmits a request to the server requesting any changes to the metadata on the server, at 432. The request includes an indication of when the last synchronization occurred between the server and the client. In some embodiments, this indication may be the synchronization time stamp (synch TS) 230 (FIG. 2A). The request is then received by the server (434).

The servers then determine whether any changes to any of the data objects or metadata have been made since the last time that the server synchronized with the client. This may be determined by comparing the modification dates of any of the data objects (or associated metadata entries) with the synchronization time stamp (synch TS) received from the client. If no changes have been made on the server (436—No), the server either ignores the request for changes or transmits a message back to the client that no changes were made (not shown). However, if changes have been made on the server (436—Yes), then the server transmits the changed metadata entry to the client (438).

The client receives the changed metadata entry from the server, at 440, and the client then determines, at 442, whether the metadata entry received from the server already exists on the client, i.e., whether a metadata entry (and associated data object) having the same data object identifier 252 (FIG. 2B) already exists on the client.

If the metadata entry received from the server does not already exist on the client (442—No), i.e., a new data object exists at the server, then the client determines from the metadata, at 462, whether a different data object exists on the client with the same path as the data object associated with the metadata entry received from the server. If no other data object exists on the client that has the same path as the data object associated with the metadata entry received from the server (462—No), i.e., the new metadata entry received from the server does not conflict with another metadata entry on the client, then the new metadata entry is stored on the client at step 464. The new metadata entry stored on the client includes the latest version number 256 (FIG. 2B) for that metadata entry at 482 (FIG. 4C).

If, however, another data object exists on the client that has the same path as the data object associated with the metadata entry received from the server (462—Yes), then the client requests a conflict resolution from the user at 460. An example of a conflict resolution graphical user interface (GUI) is shown and described below in relation to FIG. 5.

Although other options may exist, at least the following choices are given to the user: (i) discard the client data object and its metadata entry, i.e., the server metadata entry trumps the client metadata entry, or (ii) overwrite the server data object with the client data object, i.e., the client metadata entry trumps the server metadata entry. If the user chooses to discard the client data object, the client metadata entry is overwritten by the server metadata entry at 466. The new metadata entry stored on the client is then given the latest version number 256 (FIG. 2B) for that metadata entry at step 482 (FIG. 4C).

If the user chooses to overwrite the server data object, the client determines, at 468, whether the metadata entry on the client has a data object identifier 252 (FIG. 2B). The only time that a metadata entry on the client (with a data object having the same path as the data object associated with the metadata received from the server) will not have a data object identifier 252 (FIG. 2B) is if a new data object has been created on the client, but has not yet been assigned an identifier from the server.

If the client metadata entry does not have a data object identifier (468—No), the client applies the identifier of the server metadata entry to the client metadata entry at 470. If the metadata entry on the client has a data object identifier (468—Yes), then the server metadata entry is marked for deletion (i.e., the server metadata entry is marked in the client as deleted, which will cause it to be deleted during execution of the next commit phase 400) and is stored as a new metadata entry in the client (472). Furthermore, the new metadata entry stored on the client is given the latest version number 256 (FIG. 2B) for that metadata entry (482, FIG. 4C).

In some embodiments, in response to a request for conflict resolution (460 or 454 or 576), the user may rename or move a conflicting client file so as to eliminate the conflict. In some embodiments, when a client file is renamed or moved in response to a request for conflict resolution, the processing of the received server metadata entry restarts at 442.

Returning to reference numeral 442, if the client has a client metadata entry that has the same data object identifier as the server metadata entry (received from the server) (442—Yes), then the client determines, at 444, whether client also has a second client metadata entry (a "same path entry") associated with a data object that has the same path as the server entry, but a different data object identifier than the server entry. If the client does not have a second client metadata entry with the same path as the received server entry, but a different data object identifier, (444—No), then the client determines, at 446, whether the data object on the client (i.e., the client data object having the matching data object identifier) has been modified. This may be determined by comparing the client and server metadata entries. If the data object on the client has not been modified, i.e., only the data object on the server was changed while the data object on the client was not, (446—No), then the client metadata entry is overwritten with the metadata entry received from the server (448). The metadata entry stored on the client is given the latest version number 256 (FIG. 2B) for that metadata entry (482, FIG. 4C).

However, if the data object on the client has been modified, i.e., the data object on the client and server were both changed, (446—Yes), then the client determines whether a conflict exists between the data objects (or associated metadata) on the client and server (450). For example, the server metadata entry may have changed the permissions for the data object while the client metadata entry may have changed the data object's name, which will not result in a conflict between the metadata entries as both changes can be implemented without a conflict. Therefore, if no conflict exists (450—No), the non-conflicting changes from the server metadata entry are applied to the client metadata entry (452).

If however, a conflict does exist (450—Yes), then the client requests a conflict resolution from the user at 454. An example of a conflict resolution graphical user interface is shown and described below in relation to FIG. 5.

As described above, at least the following two choices are given to the user (i) discard the client data object and its metadata entry, i.e., the server metadata entry trumps the client metadata entry, or (ii) overwrite the server data object with the client data object, i.e., the client metadata entry trumps the server metadata entry. If the user chooses to discard the client data object, the client metadata entry is overwritten by the server metadata entry at 458. If the user chooses to overwrite the server data object with the client data object, then the server metadata entry is ignored at 456. The client metadata entry is then given the latest version number 256 (FIG. 2B) of the server metadata entry at 482 (FIG. 4C), which will cause the client metadata entry to overwrite the server metadata entry in the server during the next execution of the commit phase 400.

Returning to reference numeral 444. If there is a second client metadata entry (called a "same path entry") that is associated with a second data object that has the same path, but a different data object identifier, as the data object associated with the received server metadata entry (444—Yes), then the client requests a conflict resolution from the user at 476 (FIG. 4C). An example of a conflict resolution graphical user interface is shown and described below in relation to FIG. 5.

As described above, the conflict resolution GUI provides at least two choices to the user, namely (i) to discard the client data objects (i.e., both the first client data object corresponding to the object identifier of the received server metadata entry, and the second client object having the same path and the received server metadata entry), i.e., the server metadata entry trumps the client metadata entries, or (ii) to overwrite the server data object with the "same path" client data object, i.e., the client metadata entry for the "same path file" trumps the server metadata entry.

If the user chooses at 476 to discard the client data object, the client metadata entry with the same path as the server metadata entry is marked as deleted on the client (i.e., the client metadata entry is marked as deleted) (478), and the client metadata entry (with the same data object identifier as the server metadata entry) is overwritten with the server metadata entry (480). For example, consider the situation in which two files exist on the client, the first with an identifier 2 and a path of C, and the second with an identifier 3 (data object ID 3) and a path D, while the server metadata entry has a data object identifier of 2 and a path of D. Then, a client metadata entry (called the "same ID entry") with the same data object identifier (2) exists on the client (442—Yes), and a client metadata entry (called the "same path entry") with the same path (D) but a different identifier (3) (444—Yes) also exists on the client. Therefore, if the user selects to discard the client data object (and associated metadata entry), then the "same path entry" (the client metadata entry with an identifier of 3 and a path of D) is deleted (step 478) and the "same ID entry" (the client metadata entry with an identifier of 2 and a path of C) is overwritten by the server metadata entry with an identifier of 2 and a path of D. The resulting metadata entry stored on the client is then given the latest version number 256 (FIG. 2B) for that metadata entry at step 482.

However, if the user chooses (at 476) to overwrite the server data object with the "same path" client data object, both the client and server files corresponding to the data object identifier of the received server metadata entry are deleted. Only the same path file survives. At 484, the client determines whether the client data object (herein called the "same path client file") having the same path as the received server metadata entry is known to the server. In other words, has the same path client file ever been synchronized with the server. In our example, the client determines at 484 whether there a server metadata entry with data object identifier 3. If not, the same path client file is effectively a new client file that has not yet been assigned a data object identifier and version number.

Continuing with the above example, the client inspects the client metadata entry for the same path client file to determine if it has ever been synchronized with the server (484). For example, the client metadata entry for the same path client file may have a synchronization timestamp that is unequal to a default or null value, thereby indicating a prior synchronization with the server. If so (484—Yes), the fields of the received server metadata entry (i.e., with path D and ID 2, in our example) are copied into the "same ID entry" (i.e., the client metadata entry having the same data object identifier as the server metadata entry) at 492. The modified client metadata entry (i.e., the "same ID entry") is then marked as deleted at 494, i.e., the deleted flag field 262 (FIG. 2B) is set and this same client metadata entry is given the latest version number 256 (FIG. 2B) for that metadata entry at 482. As a result, the client metadata entry will overwrite the server metadata entry when the next commit phase is executed, and the corresponding client and server files will be deleted. Also, the "same path" client file (file 3, path D) will be retained at the client, and copied to the server if the server does not already have the current version of that file. In an alternate embodiment, the server metadata entry may be marked as deleted, and then copied into the "same ID entry" at 492, 494.

However, if the "same path entry" has not ever been synchronized with the server (484—No), several operations (486-490) are performed so that the same path file in the client takes over or hijacks the client metadata entry whose data object identifier matches the data object identifier in the receiver server metadata entry. In some embodiments, the client makes a new metadata entry that is a copy or clone of the same path entry (i.e., the client metadata entry with the same path as the received server metadata entry) (486). The original client metadata entry with the same path is marked as deleted at 488. The new or cloned metadata entry (including the name of the same path data object) is then copied into the client metadata entry (i.e., the "same ID entry") at 490, while leaving the data object identifier and synchronization information in the client metadata entry unchanged. Finally, the client metadata entry (i.e., the "same ID entry") is given the latest version number 256 (FIG. 2B) of the received server metadata entry at 482. The metadata entry that has been marked as deleted will cause the client file having the same data object identifier as the received server metadata entry to be deleted. The hijacked client metadata entry will overwrite the server metadata entry when the next commit phase is executed, thereby causing the same path client file (e.g., the client file with path D in our example) to overwrite the corresponding server file after the next commit phase (see 616, FIG. 6).

Figure 5:
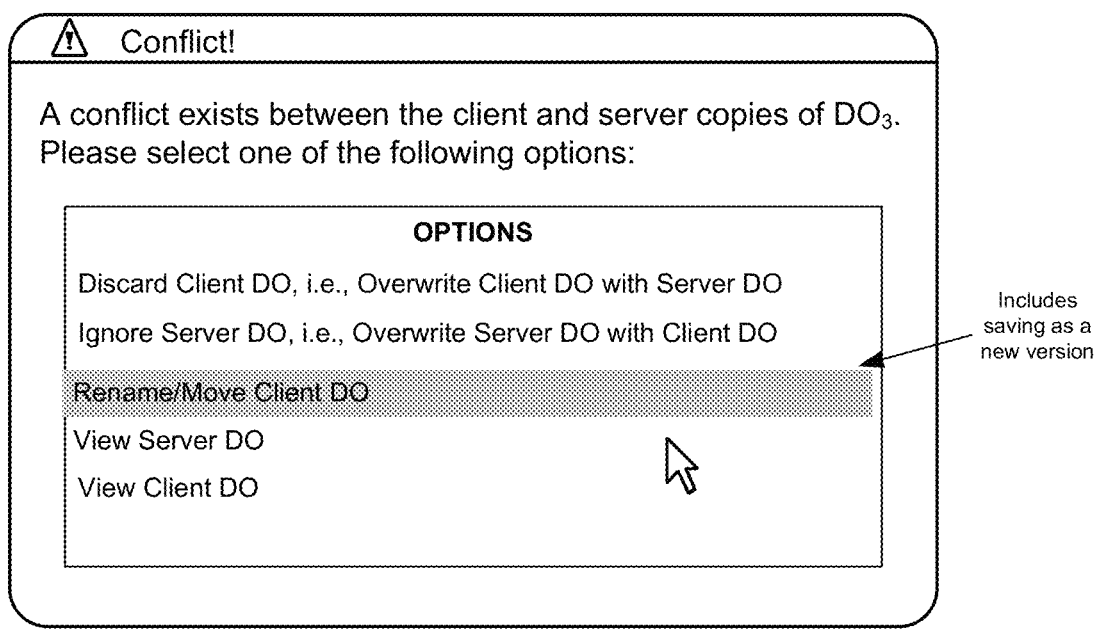
FIG. 5 is a user interface screenshot presented to a user during the conflict management process of the metadata synchronization process, according to one embodiment of the invention.

FIG. 5 is a user interface screenshot that is displayed to a user to request conflict resolution. As can be see from this screenshot, the client computer presents the user with a number of conflict management and resolution options, including (i) discarding the client data object, i.e., overwriting the client data object with the server data object; (ii) ignoring the server data object, i.e., overwriting the server data object with the client data object; (iii) renaming or moving the client data object; (iv) viewing the server object; and (v) viewing the client object. In some embodiments, the user may be given the option of renaming or moving the server data object so as to resolve the conflict.

As described in related U.S. patent application Ser. No. 11/323,199, filed Dec. 30, 2005, entitled "Locally Cached File System," files and other data objects are copied from server to client, or vice versa, in accordance with changes in the synchronized client and server metadata entries. The copying of files and other data objects may be accomplished using a background process so as to avoid disrupting other operations being performed by the client computer.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description.

What is claimed is:

1. A method for synchronizing data objects, comprising:
at a computing device,
obtaining a first metadata entry associated with a first data object, the first metadata entry including:
(i) a first file name, wherein the first file name includes a directory path for the first data object; and
(ii) a first data object identifier distinct from the first file name;
obtaining a second metadata entry associated with a second data object, the second metadata entry including:
(i) a second file name, wherein the second file name includes a directory path for the second data object; and
(ii) a second data object identifier distinct from the second file name;
determining, using the first and second data object identifiers, whether the first data object and the second data object correspond to the same data object; without regard to the first file name and the second file name; and
in accordance with a determination that the first data object and the second data object correspond to the same data object:
synchronizing the first data object with the second data object, including:
determining whether a third data object with a directory path matching the first directory path exists, wherein the third data object is stored on a computing devices different from a computing device on which the first data object is stored; and
in accordance with a determination that the third data object exists:
performing a conflict resolution action; and
in accordance with a determination that the third data object does not exist:
performing one or more synchronization operations on the first data object or the second data object.

2. The method of claim 1, wherein synchronizing the first data object with the second data object includes:

determining whether a conflict exists between the first data object and the second object; and performing a conflict resolution action, in accordance with a determination that a conflict exists between the first data object and the second data object.

3. The method of claim 1, wherein the first data object is stored on a server; and the second data object is stored on a client device.

4. The method of claim 1, wherein the first data object is stored on a first client device; and the second data object is stored on a second client device distinct from the first client device.

5. The method of claim 1, wherein the first data object and the second data object correspond to different versions of the same data object.

6. A computer system, comprising:
one or more processors;
memory; and
one or more programs, wherein the one or more programs are stored in the memory and configured to be executed by the one or more processors, the one or more programs including instructions for:
obtaining a first metadata entry associated with a first data object, the first metadata entry including:
(i) a first file name, wherein the first file name includes a directory path for the first data object; and
(ii) a first data object identifier distinct from the first file name;
obtaining a second metadata entry associated with a second data object, the second metadata entry including:
(i) a second file name, wherein the second file name includes a directory path for the second data object; and
(ii) a second data object identifier distinct from the second file name;
determining, using the first and second data object identifiers, whether the first data object and the second data object correspond to the same data object, without regard to the first file name and the second file name; and
in accordance with a determination that the first data object and the second data object correspond to the same data object:
synchronizing the first data object with the second data object, including:
determining whether a third data object with a directory path matching the first directory path exists, wherein the third data object is stored on a computing device different from a computing device on which the first data object is stored; and
in accordance with a determination that the third data object exists:
performing a conflict resolution action; and
in accordance with a determination that the third data object does not exist:
performing one or more synchronization operations on the first data object or the second data object.

7. The system of claim 6, wherein the instructions for synchronizing the first data object with the second data object include instructions for:
determining whether a conflict exists between the first data object and the second object; and performing a conflict resolution action, in accordance with a determination that a conflict exists between the first data object and the second data object.

8. The system of claim 6, wherein the first data object is stored on a server; and the second data object is stored on a client device.

9. The system of claim 6, wherein the first data object is stored on a first client device; and the second data object is stored on a second client device distinct from the first client device.

10. The system of claim 6, wherein the first data object and the second data object correspond to different versions of the same data object.

11. A non-transitory computer readable storage medium storing one or more programs, the one or more programs comprising instructions, which when executed by a computer system with one or more processors, cause the computer system to:
obtain a first metadata entry associated with a first data object, the first metadata entry including:
(i) a first file name, wherein the first file name includes a directory path for the first data object; and
(ii) a first data object identifier distinct from the first file name;
obtain a second metadata entry associated with a second data object, the second metadata entry including:
(i) a second file name, wherein the second file name includes a directory path for the second data object; and
(ii) a second data object identifier distinct from the second file name;
determine, using the first and second data object identifiers, whether the first data object and the second data object correspond to the same data object, without regard to the first file name and the second file name; and
in accordance with a determination that the first data object and the second data object correspond to the same data object:
synchronize the first data object with the second data object, including:
determine whether a third data object with a directory path matching the first directory path exists, wherein the third data object is stored on a computing device different from a computing device on which the first data object is stored; and
in accordance with a determination that the third data object exists:
perform a conflict resolution action; and
in accordance with a determination that the third data object does not exist:
perform one or more synchronization operations on the first data object or the second data object.

12. The non-transitory computer readable storage medium of claim 11, wherein the first data object is stored on a server; and the second data object is stored on a client device.

13. The non-transitory computer readable storage medium of claim 11, wherein the first data object is stored on a first client device; and the second data object is stored on a second client device distinct from the first client device.

14. The non-transitory computer readable storage medium of claim 11, wherein the first data object and the second data object correspond to different versions of the same data object.

* * * * *